United States Patent [19]

Slegel et al.

[11] Patent Number: 6,088,791
[45] Date of Patent: Jul. 11, 2000

[54] COMPUTER PROCESSOR SYSTEM FOR IMPLEMENTING THE ESA/390 STOSM AND STNSM INSTRUCTIONS WITHOUT SERIALIZATION OR ARTIFICIALLY EXTENDING PROCESSOR EXECUTION TIME

[75] Inventors: Timothy John Slegel, Staatsburg; Charles Franklin Webb, Poughkeepsie, both of N.Y.

[73] Assignee: International Business Machines Corporation, Armonk, N.Y.

[21] Appl. No.: 09/070,199

[22] Filed: Apr. 30, 1998

[51] Int. Cl.[7] .............................. G06F 9/305; G06F 9/308; G06F 9/318; G06F 9/48; G06F 13/24
[52] U.S. Cl. ........................ 712/223; 712/224; 712/244; 712/245; 712/208; 712/205; 712/229; 710/48; 710/49
[58] Field of Search ..................................... 712/228, 234, 712/241, 223, 224, 244, 245, 208, 205, 229; 710/262, 48, 49

[56] References Cited

U.S. PATENT DOCUMENTS

| | | | |
|---|---|---|---|
| 4,891,749 | 1/1990 | Hoffman et al. ........................ | 711/152 |
| 5,003,468 | 3/1991 | Watanabe et al. ...................... | 710/262 |
| 5,060,148 | 10/1991 | Isobe et al. .................................... | 712/6 |
| 5,257,354 | 10/1993 | Comfort et al. ........................... | 714/16 |
| 5,307,483 | 4/1994 | Knipfer et al. ............................ | 714/10 |
| 5,345,567 | 9/1994 | Hayden et al. .......................... | 712/228 |
| 5,410,660 | 4/1995 | Divine et al. ........................... | 712/234 |
| 5,440,703 | 8/1995 | Ray et al. ................................. | 712/228 |
| 5,495,587 | 2/1996 | Comfort et al. ......................... | 712/228 |
| 5,555,414 | 9/1996 | Hough et al. ............................ | 710/261 |
| 5,619,704 | 4/1997 | Yagi et al. ............................... | 710/262 |
| 5,898,866 | 4/1999 | Atkins et al. ............................ | 712/241 |

OTHER PUBLICATIONS

"The Effects of MP Serialization on Logical Partitioning Capacity" by Bob Ellsworth, Amdahl Corporation, pp. 399–407 Date Unknown.

"Maintaining Application Compatibility in Multiprocessor Environments" IBM Technical Disclosure Bulletin, vol. 38, No. 8, Aug. 1995, pp. 333–334.

Special Serialization for "Load–with–Update" Instruction to Reduce the Complexity of Register Renaming Circuitry IBM Technical Disclosure Bulletin, vol. 37, No. 10, Oct. 1994, pp. 59–60.

(List continued on next page.)

*Primary Examiner*—Richard L. Ellis
*Assistant Examiner*—Jungwon Chang
*Attorney, Agent, or Firm*—Lynn L. Augspurger

[57] ABSTRACT

A computer processor that allows the execution of the IBM ESA/390 STOSM and STNSM instructions, in an overlapped fashion, contains an apparatus that allows the STOSM and STNSM instructions to be executed without serializing the processor, or otherwise delaying subsequent instructions, after the STOSM or STNSM instruction, in most cases, thereby improving performance. It contains a mechanism that counts cycles after their execution and prohibits asynchronous interrupts during that time. The invention also contains an efficient mechanism for handling the execution of the STOSM and STNSM instructions when the processor is executing in the SIE environment.

2 Claims, 3 Drawing Sheets

OTHER PUBLICATIONS

"PowerPC 601/604 Multiprocessor Random Verification Methodology" IBM Technical Disclosure Bulletin, vol. 37, No. 10, Oct. 1994, pp. 557–561.

"Designing Flexibility into Hardwired Logic" IBM Technical Disclosure Bulletin, vol. 37, No. 3, Mar. 1994, pp. 321–324.

"Multisequencing in a Single Instruction Stream Processing of Parallel Streams" IBM Technical Disclosure Bulletin, vol. 37, No. 1, Jan. 1994, pp. 133–139.

"Offloading Synchronization at 2nd Level" IBM Technical Disclosure Bulletin, vol. 36, No. 7, Jul. 1993, pp. 471–474.

"Multisequencing a Single Instruction Stream—Meta High–End Machine Eliminating SLIST and DLIST" IBM Technical Disclosure Bulletin, vol. 36, No. 6A, Jun. 1993, pp. 91–94.

MSIS Handling S/370 Serialization in MSIS Without Delay, IBM Technical Disclosure Bulletin, vol. 36, No. 1, Jan. 1993, pp. 466–469.

"MSIS MP Version" IBM Techncial Disclosure Bulletin, vol. 36, No. 1, Jan. 1993, pp. 317–322.

"System Support for Multiporcossing without an Atomic Storage" IBM Techincal Disclosure Bulletin, vol. 33, No. 9, Feb. 1991, pp. 18–23.

6,088,791

COMPUTER PROCESSOR SYSTEM FOR IMPLEMENTING THE ESA/390 STOSM AND STNSM INSTRUCTIONS WITHOUT SERIALIZATION OR ARTIFICIALLY EXTENDING PROCESSOR EXECUTION TIME

FIELD OF THE INVENTION

This invention is related to a system and method for implementing in a new CMOS machine the ESA/390 architected instructions STOSM and STNSM when overlap is enabled while avoiding the need to always serialize after the execution of a STOSM or STNSM to allow for latencies to facilities kept in the system asynchronous interrupt logic.

Glossary

STNSM is the ESA/390 instruction for STORE THEN AND SYSTEM MASK.

STOSM is the ESA/390 instruction for STORE THEN OR SYSTEM MASK.

SIE is the ESA/390 instruction for START INTERPRETIVE EXECUTION.

The XPIE bits in the SIE state descriptor determine if a SIE intervention check is necessary for various events including bits 6:7 of the PSW becoming a one.

These are defined as part of the Enterprise Systems Architecture/390 as defined by the current Principles of Operation, e.g. SA22-7201-00

BACKGROUND OF THE INVENTION

The IBM ESA/390 architecture requires some very precise implemelitation requirements regarding the STORE THEN OR SYSTEM MASK (STOSM) and STORE THEN AND SYSTEM MASK (STNSM) instructions. These instruction modifies the system mask field in the PSW.

In previous IBM S/390 processor designs, this problem was solved by either executing the instruction in microcode/millicode or by unconditionally serializing the processor after execution of the STOSM or STNSM instructions. By serializing the processor, we mean discarding all instructions that have been pre-fetched or decoded but not executed to completion and restarting instruction fetching again. This would allow time for the asynchronous interrupt logic to correctly determine if an I/O or external interrupt is really present based on the updated copy of the bits in the PSW. However, this serialization processor wastes cycles and reduces processor performance. Another solution would be to artificially lengthen the execution time of the STOSM and STNSM instructions to allow the asynchronous interrupt logic to process any interrupts based on the updated PSW bits. But again, this reduces processor performance. The IBM ESA/9000 series as disclosed in U.S. Pat. No. 5,345,567 used a method to minimize serializations following STOSM/STNSM. However, since it had a method of nullifying an instruction at anytime during its execution, it had an easy general mechanism for handling STOSM with full instruction overlap. In other processor designs, however, it is not possible to nullify an instruction after its execution has begun. Therefore, without this invention the STOSM and STNSM instructions could not be executed with full instruction overlap, so a need arises to maintain the system architecture stability yet allow better timing in our new machines.

Consistent with the disclosure in U.S. Pat. No. 5,345,567, issued Sep. 6, 1994 and entitled "System and method for modifying program status word, system mask, system access key, and address space code with overlap enabled" by Hayen et al, in an S/390 CPU, the STORE THEN OR SYSTEM MASK (STOSM) and STORE THEN AND SYSTEM MASK (STNSM) instructions are used to modify bits 0:7 of the PSW, called the System Mask. STOSM can only turn on bits in the System Mask and STNSM can only turn bits off. They are commonly used to quickly enable or disable I/O or External Interrupts (bits 6:7 of the PSW). Obviously since bits 0:5 can also be modified by these instructions, an implementation must handle this usage, although it is not nearly as performance critical as changes to bits 6:7.

The ESA/390 architecture requires some very precise implementation requirements. Suppose, for example. an External Interrupt is pending but bit 7 of the PSW is 0. Now suppose the processor executes a STOSM instruction that sets bit 7 to 1. The ESA/390 architecture requires the External Interrupt to be taken immediately after executing the STOSM instruction and before executing the next sequential instruction. This makes it difficult to implement a STOSM instruction efficiently.

Similarly, suppose an External Interrupt has just become pending during the execution of a STNSM instruction. Now suppose this STNSM instruction sets bit 7 of the PSW to 0. The ESA/390 architecture requires that no External Interrupt should be presented after the STNSM instruction has turned off bit 7 of the PSW.

There are also complications in the START INTERPRETIVE EXECUTION (SIE) environment related to the STOSM instruction. If the XPIE bits in the SIE state descriptor indicate a SIE intervention check needs to be performed when a STOSM instruction turns on bits 6 or 7 in the PSW, this must be done immediately after the STOSM instruction is completed. This intervention check is typically too complex to perform in hardwired logic, so it is normally performed by microcode or millicode as it is in the processor described in the preferred embodiment of this invention. The interrupt to invoke this microcode/millicode routine takes several cycles to occur, so other instructions must be blocked from occurring until it is determined if a SIE intervention check needs to be performed.

SUMMARY OF THE INVENTION

Our invention provides a finish counter mechanism to control the serialization process. The improvements which we have made improves performance by avoiding the processor serialization, in most cases, after execution of a STOSM or STNSM instruction.

Our invention also provides a means for detecting if a SIE intervention check is required and presenting it as interrupt to microcode/millicode before any subsequent ESA/390 instructions are executed after the execution of a STOSM instruction.

These and other improvements are set forth in the following detailed description. For a better understanding of the invention with advantages and features, refer to the description and to the drawings.

BRIEF DESCRIPTION OF THE DRAWINGS

FIG. 2 illustrates in a flow diagram the execution of the STOSM instruction while

Figure 1:
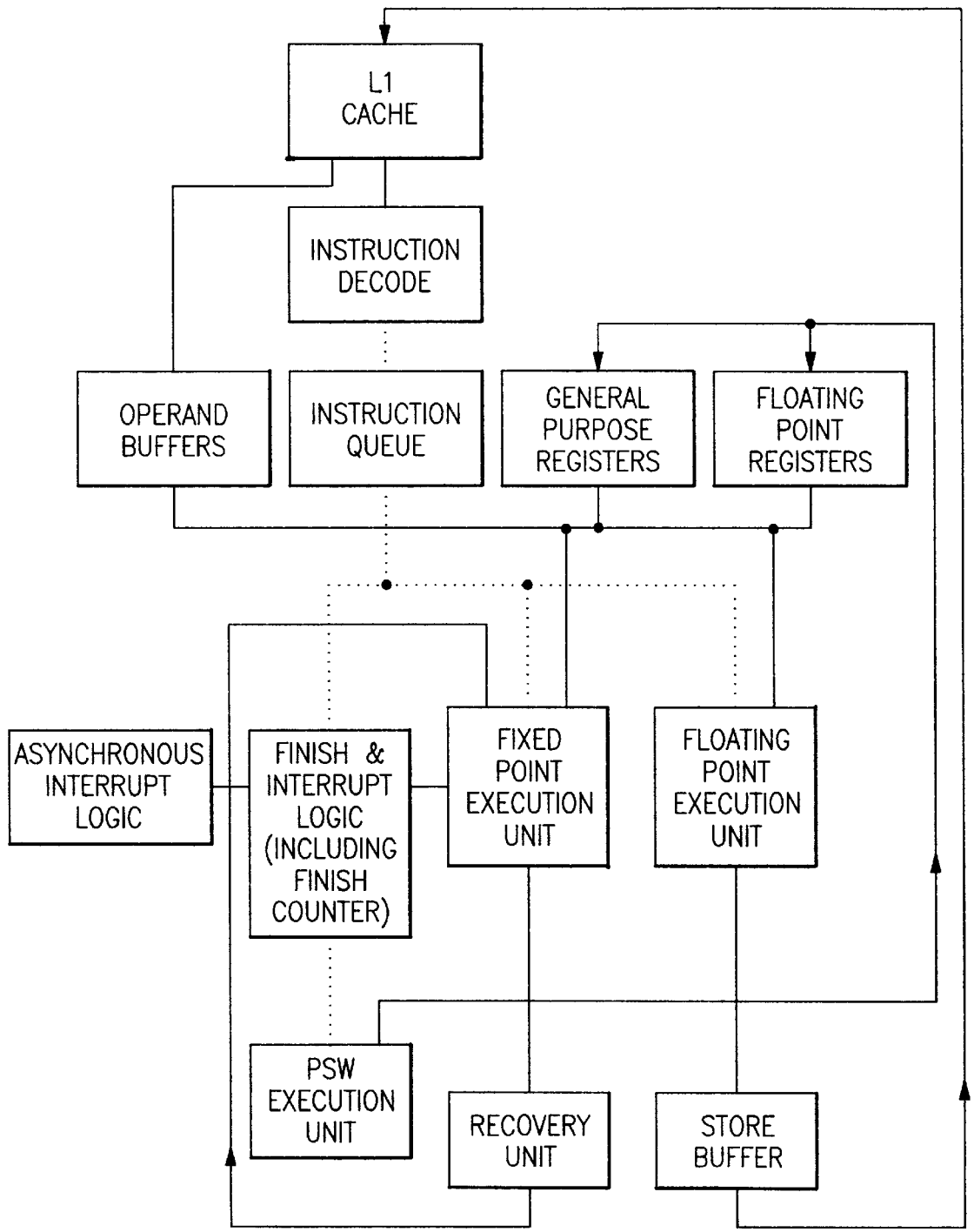
FIG. 1 shows schematically an overview of the preferred embodiment and particularly shows a block diagram illustrating the main components of a typical central processor (CP) in accordance with a preferred specific embodiment of the invention. Of particular interest is the PSW Execution Unit that executes the STOSM and STNSM instructions and its interface to the finish and interrupt logic which contains the finish counter and provides the mechanism for serializing the processor only when it is necessary to do so.

(Note: For convenience of illustration, FIGURES may be separated in parts and as a convention we place the top of the FIGURE as the first sheet, with subsequent sheets proceeding down and across when viewing the FIGURE, in the event that multiple sheets are used.)

DETAILED DESCRIPTION OF THE INVENTION

Before considering our preferred embodiments in detail, it may be worthwhile to point out some details which should be understood about the architecture that we need to satisfy.

When considering this embodiment must be remembered that due to pipeline latencies and the time required for the asynchronous interrupt logic to generate the interrupt based on the changed System Mask, the next instruction could have been in execution (or even completed) before the asynchronous interrupt logic could reevaluate the requirements for an interrupt based on the updated PSW mask. Therefore, when a STOSM or STNSM instruction executes, a mechanism must exist to prevent subsequent instructions from executing until the asynchronous interrupt logic has had an opportunity to reevaluate whether or not to produce an interrupt.

Note that in most cases, asynchronous interrupts will not be pending at the time a STNSM or STOSM is executed. However, the hardware must be designed to get the correct result in the relatively rare event that they are.

There are some additional complications in achieving an efficient implementation of STOSM when SIE is active. The XPIE bits in the SIE State Descriptor control whether a SIE Intervention Check is required when bits 6:7 of the PSW are 1, which is a likely consequence of executing a STOSM instruction. In addition, the SIE architecture requires a mandatory Intervention Check (to pick up the SIE State Descriptor in storage that may have been modified by a different CPU in the system) upon execution of any STOSM instruction, unless the SIE Intervention Bypass bit is 1 (the normal case).

Our mechanism for implementing the STOSM and STNSM instructions efficiently uses no wasted cycles for the normal case. The method for implementing STOSM and STNSM in an efficient mechanism also can be used for implementing STOSM under SIE with a relatively small addition.

The following is a description of the logic equations used by our invention followed by a description of their use.

---

Instruction Finish/Interrupt Logic:

ASYNC_PROHIB_CNT_REG (0:1) <=   "01" when (STOSM_EX or STNSM_EX) else
                                "00" when (ASYNC_PROHIB_CNT_REG="00") else
                                ASYNC_PROHIB_CNT_REG + "01";
ASYNC_PROHIB <=                 (STOSM_EX or STNSM_EX) or
                                (ASYNC_PROHIB_CNT_REG /= "00");
STOSM_FRC_SRLZ <=               (CHANGE_IN_SYS_MASK_0_5 and (STOSM_EX or STNSM_EX)) or
                                (SIE_ACTIVE and (not SIE_INTV_BYPASS) and STOSM_EX) or
                                (ASYNC_PROHIB and (ASYNC_PENDING or POS_IO_EXT_IRPT));
SIE_CHECK_XPIE <=               STOSM_EX and
                                (NEW_SYS_MASK(6) or NEW_SYS_MASK(7) or
                                (not SIE_INTV_BYPASS));

Asynchronous Interrupt Logic:

POS_IO_EXT_IRPT <=              POS_IO_IRPT_PENDING or POS_EXT_IRPT_PENDING or
                                SIE_INTV_CHECK_REQD;
SIE_XPIE_IRPT <=                SIE$_{ACTIVE\ and}$
                                (SIE_CHECK_XPIE and SIE_INTV_CHECK_REQD);

where
SIE_CHECK_XPIE is a signal from finish logic to the asynchronous
interrupt logic and indicates an instruction is being executed
that may require an SIE intervention check.
STOSM_EX means a STOSM instruction is currently finishing execution.
STNSM_EX means a STNSM instruction is currently finishing execution.
NEW_SYS_MASK is the new PSW(0:7) about to be set.
SIE_INTV_BYPASS is ECA.1 in the SIE State Descriptor.
ASYNC_PROHIB_CNT_REG is a 2-bit counter, in our preferred embodiment,
that is used to indicate when certain asynchronous interrupts are
prohibited.
ASYNC_PROHIB is an intermediate signal used to indicate a STOSM or
STNSM has recently executed and asynchronous interrupts are currently
prohibited.
STOSM_FRC_SRLZ is a signal to the processor's serialization logic to
indicate all instructions in the pipeline should be discarded and
instruction fetching should begin again.
CHANGE_IN_SYS_MASK_0_5 indicates a STOSM or STNSM is changes other
than bits 6:7 in the PSW.
SIE_ACTIVE means the processor is currently executing in SIE's Guest1
or Guest2 modes.
ASYNC_PENDING means some asynchronous interrupt is pending (for I/O
or External, it includes masking for PSW bits 6:7).
POS_IO_EXT_IRPT is a signal from the asynchronous interrupt logic and
means an I/O or External Interrupt is pending irregardless of the -continued masking provided by PSW bits 6:7.
POS_IO_IRPT_PENDING indicates an I/O Interrupt is pending irregardless
of the masking in PSW bit 6.
POS_EXT_IRPT_PENDING indicates an External Interrupt is pending
irregardless of the masking in PSW bit 7.
SIE_INTV_CHECK_REQD is a buffered copy of the logical OR of the I and
E bits in the SIE state descriptor.
SIE_XPIE_IRPT indicates a asynchronous interrupt to
microcode/millicode is required in order to perform a SIE
Intervention check.

When a STOSM or STNSM instruction executes, the processor's finish logic starts a three cycle counter. This counter accounts for the window of cycles where the new System Mask needs to be seen by the asynchronous interrupt logic and a new evaluation of pending I/O and External Interrupts needs to be made. For a different implementation, this counter might be more or less than three cycles but the net effect is the same.

The processor's finish logic serializes the processor, perhaps more than once, if any of the following three conditions are met:

A STOSM or STNSM has changed bits 0:5 of the System Mask. Since this is a rare event, the impact to overall performance is negligible.

A STOSM was executed under SIE and the SIE Intervention Bypass was 0. The SIE architecture requires a mandatory Intervention Check of the in-storage state descriptor in this case. The processor serialization allows time for the asynchronous interrupt logic to generate this interrupt.

A STOSM or STNSM was recently executed (ASYNC_PROHIB_CNT_REG not zero), and either 1) an asynchronous interrupt is pending, including consideration of the old state of bits 6:7 of the System Mask, or 2) an I/O or External Interrupt is pending, irregardless of the old state of bits 6:7 of the System Mask. The finish logic may create multiple processor serialization events on successive cycles, until the counter finishes counting, to block any instructions from executing in this window.

Note that our preferred embodiment uses the mechanism of serialization to prevent subsequent instructions from executing since this was convenient. It should be understood that any mechanism in a processor that accomplishes this was simultaneously allowing the asynchronous interrupt logic to reevaluate pending interrupts would be acceptable.

The finish logic also notifies the asynchronous interrupt logic if a STOSM instruction is being executed that either 1) will result in PSW 6:7 being non-zero or 2) the SIE Intervention Bypass bit is off (this will require a mandatory Intervention Check).

The asynchronous interrupt logic informs the finish logic if an I/O or External Interrupt is possible, without taking into account the masking provided by PSW 6:7. This, in conjunction with the ASYNC_PROHIB_CNT_REG, allows the finish logic to block further execution of the next sequential instruction until the System Mask changes have had time to be accounted for by the asynchronous interrupt logic.

Finally, the asynchronous interrupt logic generates an interrupt to millicode/microcode if SIE_CHECK_XPIE becomes active and a SIE Intervention check is required (I or E bits in buffered state descriptor are 1).

Turning now to our invention in greater detail, it will be seen from FIG. 1 which illustrates our preferred embodiment in which a typical processor is shown and the components relevant to this invention. An L1 cache (1) containing the most recently used instruction and operand data supplies instruction text to the instruction decode logic (2). This logic parses the instruction and passes the relevant components to the instruction queue (3) where it is held until it is ready to be executed. When an instruction has been decoded, the operand address(es) is calculated and the operand(s) for that instruction are fetched from the L1 cache and held in the operand buffers (4) until it is ready for execution. The general purpose registers (5) and floating-point registers (6) also supply operands to the execution unit. When all operands for a given instruction are available, the fixed-point execution unit (7) or floating-point execution unit (8) then typically executes some function on the operand(s) for that instruction. When the execution of that instruction is finished, the results of that instruction are written to the general purpose registers (5) or floating-point registers (6). If it was a store-type instruction the results are instead put into a store buffer (10) where they will eventually be written back to the L1 cache (1). In parallel with writing results to the general purpose registers (5) or floating-point registers (6), results are also written to registers in the recovery unit (9) which contains the complete micro-architected state of the processor at any given time. Note that certain control registers may have local shadow copies within the instruction unit, execution unit, or other areas of the processor but the master copy of these control registers is always the recovery unit (9). In parallel with all the above operations, the finish and interrupt logic (11) is continuously monitoring and controlling the completion of the execution of all instructions and the writing of their results. Also, the asynchronous interrupt logic (12) is continually monitoring for pending asynchronous interrupts and presenting them to the finish and interrupt logic (11). The PSW execution unit (13) receives data to load into the PSW from the fixed-point execution unit (7). It contains the logic that monitors for changes in the System mask bits. If a STOSM or STNSM instruction is executing, it notifies the finish and interrupt logic (11) that contains the finish counter.

Figure 2:
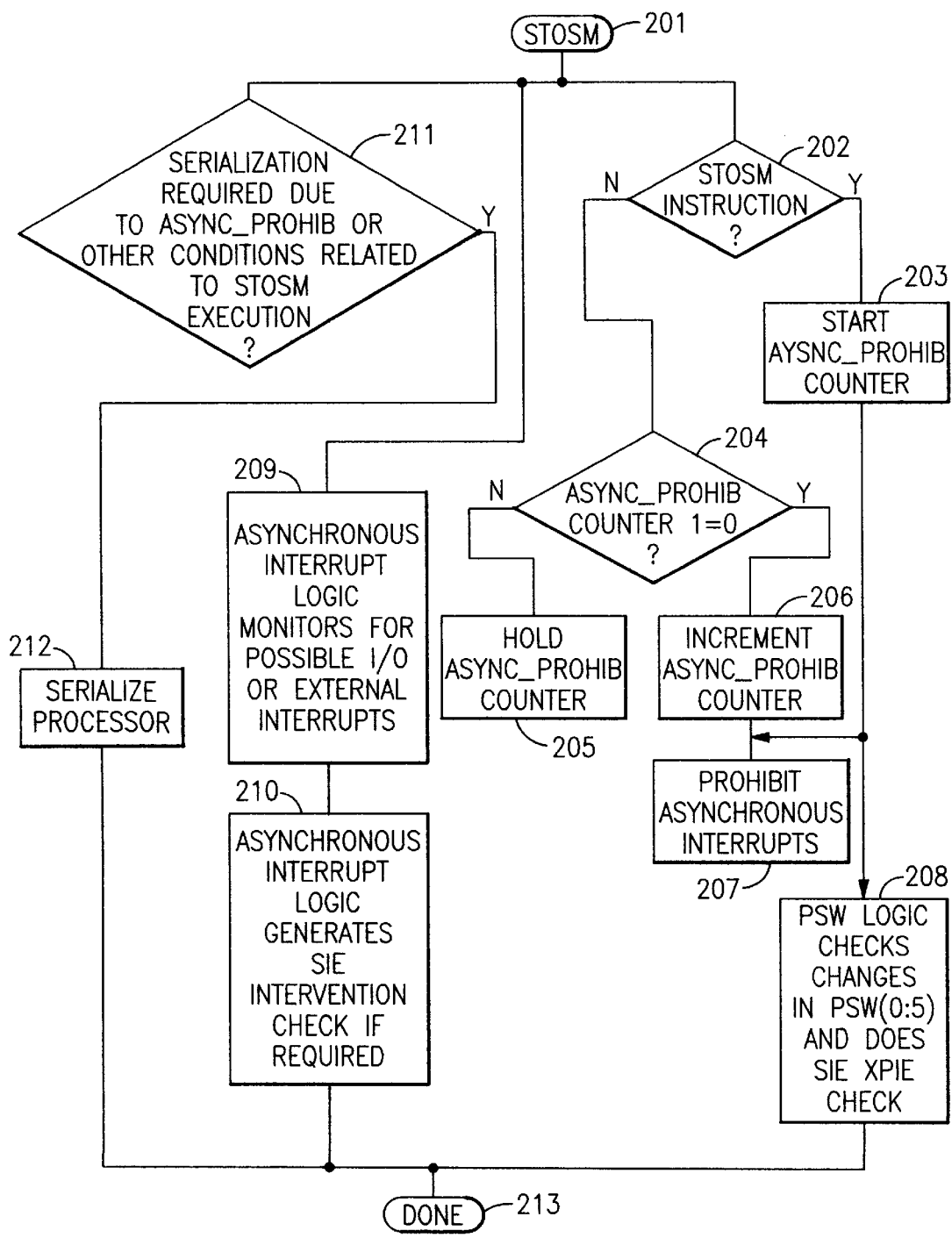

FIG. 2 illustrates a flow diagram of our method for implementation of the ESA/390 instruction STOSM (201). The PSW execution unit detects if a STOSM instruction is being executed (202). If it is, it starts the ASYNC_PROHIB counter (203). The PSW execution unit also checks for changes to bits 0:5 of the PSW (208) and if there is a change, notifies the finish logic to unconditionally serialize the processor. It also determines if bits 6:7 of the new PSW are a one (208) and if so, notifies the asynchronous interrupt logic that an XPIE check may be required. Whenever a STOSM instruction completes execution, asynchronous interrupts are prohibited from occurring on that cycle (207). The finish and interrupt logic contains the ASYNC_PROHIB counter and constantly monitors this counter (204)

to determine if it is zero. If it is zero, it is held at zero (205). Otherwise, it is incremented on each cycle (206) and asynchronous interrupts are prohibited (207). When the counter reaches its maximum, predefined value, it is reset to zero. In parallel to the above actions, the asynchronous interrupt logic monitors for possible I/O or external interrupts (209) irregardless of the state of PSW bits 6 and 7. If required, the asynchronous interrupt logic generates a SIE intervention check (210) which causes microcode/millicode to be invoked to perform this check. Also in parallel with the above, the finish and interrupt logic determines if it must serialize the processor (211) due to the ASYNC_PROHIB counter being non-zero or for any other reason related to the STOSM instruction. If so, it serializes the processor (212).

Figure 3:
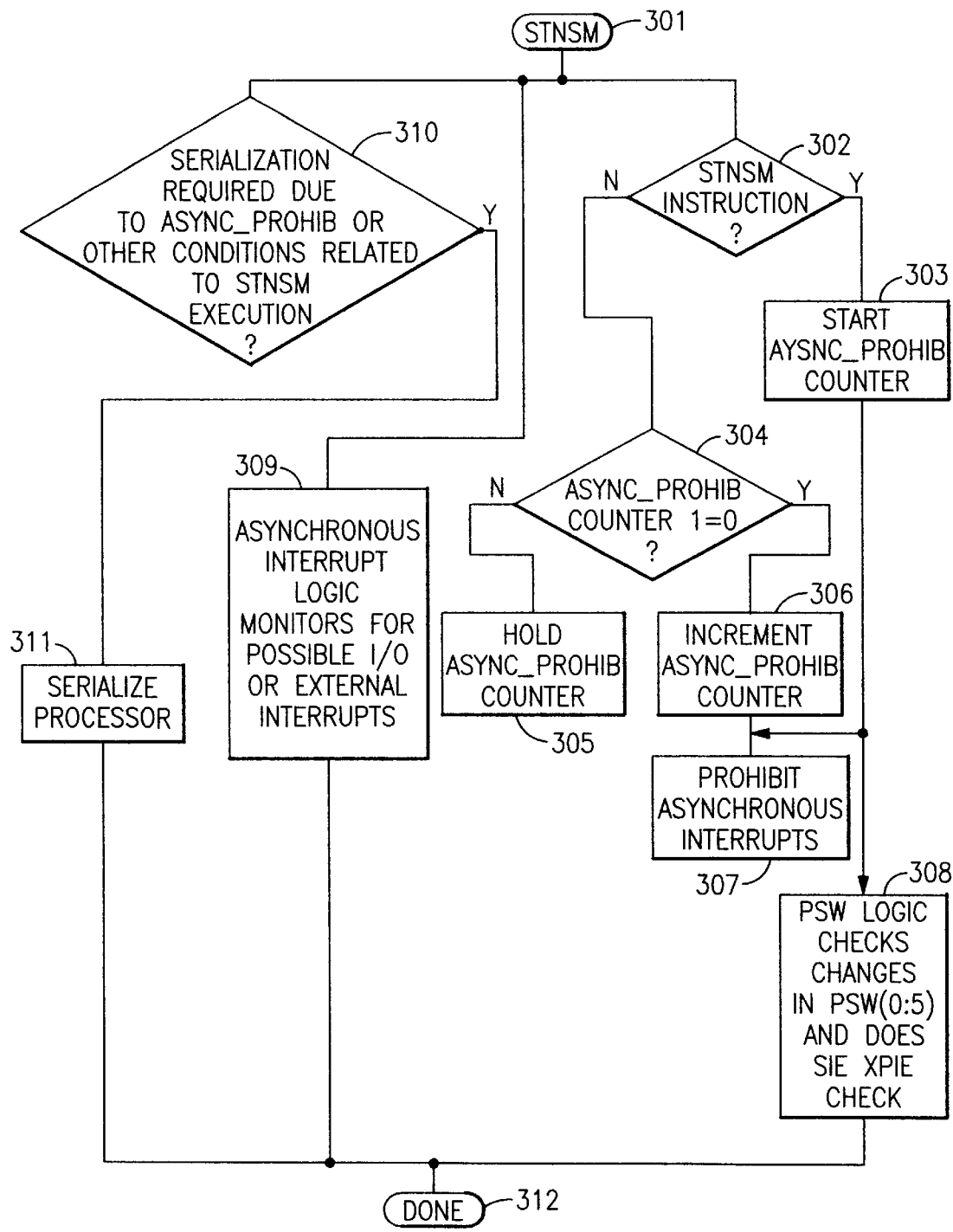
FIG. 3 illustrates in a flow diagram the execution of the STNSM instruction.

FIG. 3 illustrates a flow diagram of our method for implementation of the ESA/390 instruction STNSM (301). The PSW execution unit detects if a STNSM instruction is being executed (302). If it is, it starts the ASYNC_PROHIB counter (303). The PSW execution unit also checks for changes to bits 0:5 of the PSW (308) and if there is a change, notifies the finish logic to unconditionally serialize the processor. Whenever a STOSM instruction completes execution, asynchronous interrupts are prohibited from occurring on that cycle (307). The finish and interrupt logic contains the ASYNC_PROHIB counter and constantly monitors this counter (304) to determine if it is zero. If it is zero, it is held at zero (305). Otherwise, it is incremented on each cycle (306) and asynchronous interrupts are prohibited (307). When the counter reaches its maximum, predefined value, it is reset to zero. In parallel to the above actions, the asynchronous interrupt logic monitors for possible I/O or external interrupts (309) irregardless of the state of PSW bits 6 and 7. If required, the asynchronous interrupt logic generates a SIE intervention check (310) which causes microcode/millicode to be invoked to perform this check. Also in parallel with the above, the finish and interrupt logic determines if it must serialize the processor (311) due to the ASYNC_PROHIB counter being non-zero or for any other reason related to the STNSM instruction. If so, it serializes the processor (312).

Note the sequences described above in FIG. 2 and FIG. 3 treat the STOSM and STNSM instructions separately. However, the description applies equally well if, for example, a STNSM instruction is immediately followed by a STOSM instruction. In this case when the second instruction in the sequence executes, the ASYNC_PROHIB counter will be set to its initial starting running value again. Therefore, the total time asynchronous interrupt will be prohibited will be longer. It should be obvious that this can be generalized to any combination of back-to-back STOSM and STNSM instructions.

While we have described our preferred embodiments of our invention, it will be understood that those skilled in the art, both now and in the future, may make various improvements and enhancements which fall within the scope of the claims which follow. These claims should be construed to maintain the proper protection for the invention first disclosed.

What is claimed is:

1. A computer processor system comprising:

a processor having an I-unit that fetches and decodes instructions including ESA (Enterprise System Architecture)/390 STOSM (Store Then Or System Mask) and STNSM (Store Then And System Mask) instructions and an E-unit that executes those instructions in an overlapped manner with those of the I-unit: and finish and interrupt logic that allows a ESA/390 STOSM instruction and a ESA/390 STNSM instruction to be executed normally without processor serialization or artificially extending processor execution time after execution of the ESA/390 STOSM instruction and the ESA/390 STNSM instruction and exceptionally with processor serialization after the ESA/390 STOSM instruction and the ESA/390 STNSM instruction; and a counter which is reset when executing STOSM or STNSM instructions and after being reset said counter then begins to count machine cycles, said counter being incremented on each processor clock cycle until said counter reaches a predefined value; and a mechanism which prohibits asynchronous interrupts while said counter is being incremented to count machine cycles and until said counter has reached a redefined maximum value, and wherein a program status word (PSW) ESA/390 system mask having at least 0 though 7 bits changes value by changing bits of the system mask, and wherein the processor is serialized or otherwise delayed in execution of subsequent instructions when said counter being incremented on each processor clock cycle until it reaches a predefined value is running and an I/O or external interrupt is pending regardless of the state of bits 6 or 7 in the program status word (PSW) ESA/390 system mask which are provided for use by the mechanism which prohibits asynchronous interrupts while said counter is being incremented to count machine cycles and until it has reached its predefined maximum value, and the program status word (PSW) ESA/390 system mask value changes by changing bits of the program status word ESA/390 system mask, and when STOSM or STNSM instructions are executed and changes in the values of bits 0 to 5 of the program status word (PSW) ESA/390 system mask is detected, the computer processor system immediately serializes the processor upon detected changes in the values of bits 0 to 5 of the program status word (PSW) ESA/390 system mask, and execution of the STOSM instruction causes notifies asynchronous interrupt logic of said finish and interrupt logic that a SIE (Start Interpretive Execution) Intervention Check may be required if said apparatus detects changes in bits 6 to 7 of the ESA/390 PSW or if a SIE Intervention Bypass bit in a SIE state descriptor is zero.

2. A computer processor system as in claim 1 wherein said computer processor system has microcode/millicode operations and said SIE (Start Interpretive Execution) Intervention Check interrupt is presented to microcode/millicode whenever a SIE (Start Interpretive Execution) environment is active in the processor, new PSW bits 6 or 7 contain a one and, a locally buffered copy, within said processor, of either an I or E bit of an XPIE field in the SIE state descriptor contain a one.

* * * * *

UNITED STATES PATENT AND TRADEMARK OFFICE
CERTIFICATE OF CORRECTION

PATENT NO. : 6,088,791
DATED : July 11, 2000
INVENTOR(S) : Slegel et al.

It is certified that error appears in the above-identified patent and that said Letters Patent is hereby corrected as shown below:

Column 8,
Line 19, "redefined" should be -- predefined --.

Signed and Sealed this

Eighteenth Day of September, 2001

*Attest:*

NICHOLAS P. GODICI
*Attesting Officer*   *Acting Director of the United States Patent and Trademark Office*